Patented Jan. 16, 1923.

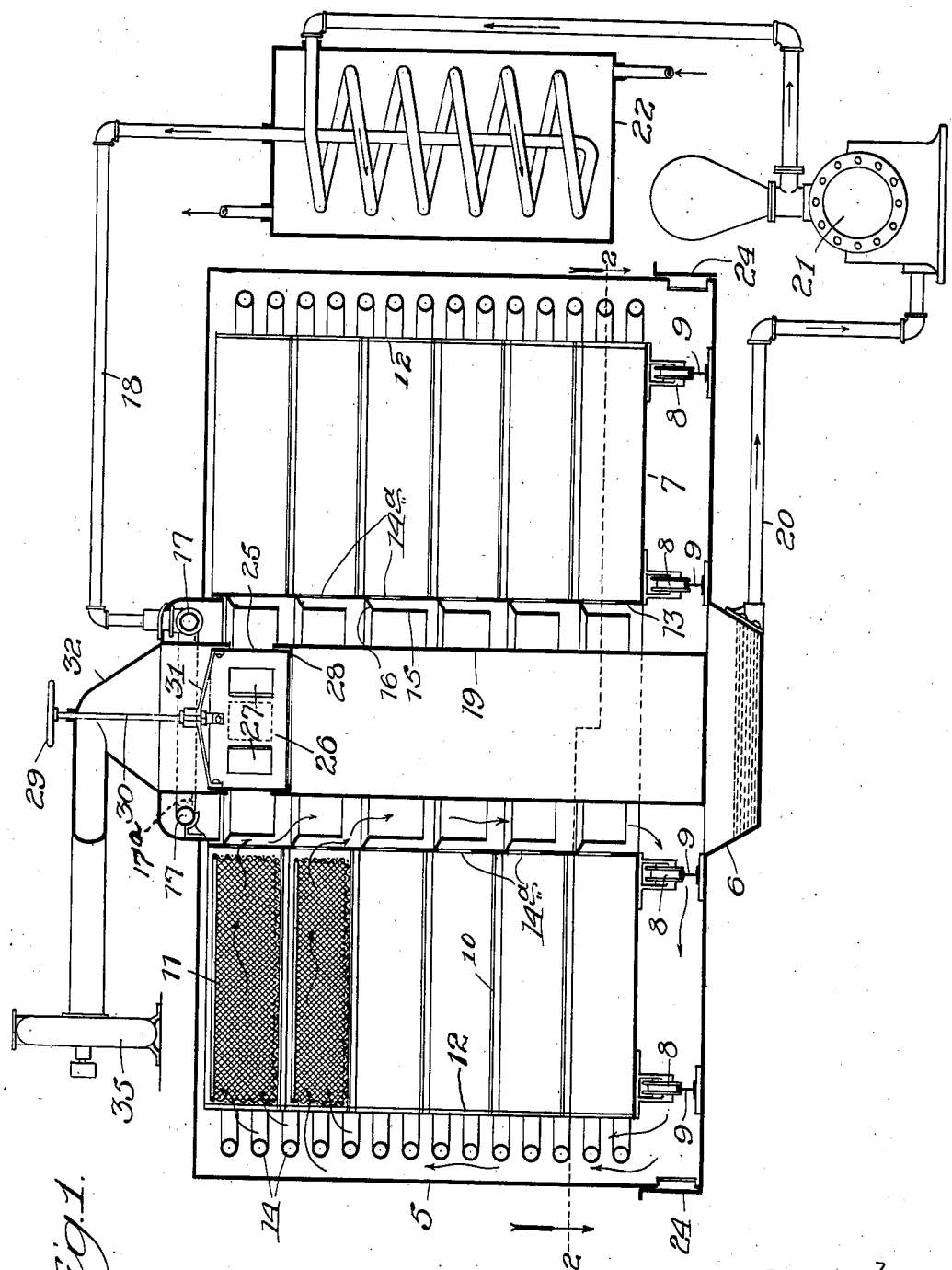

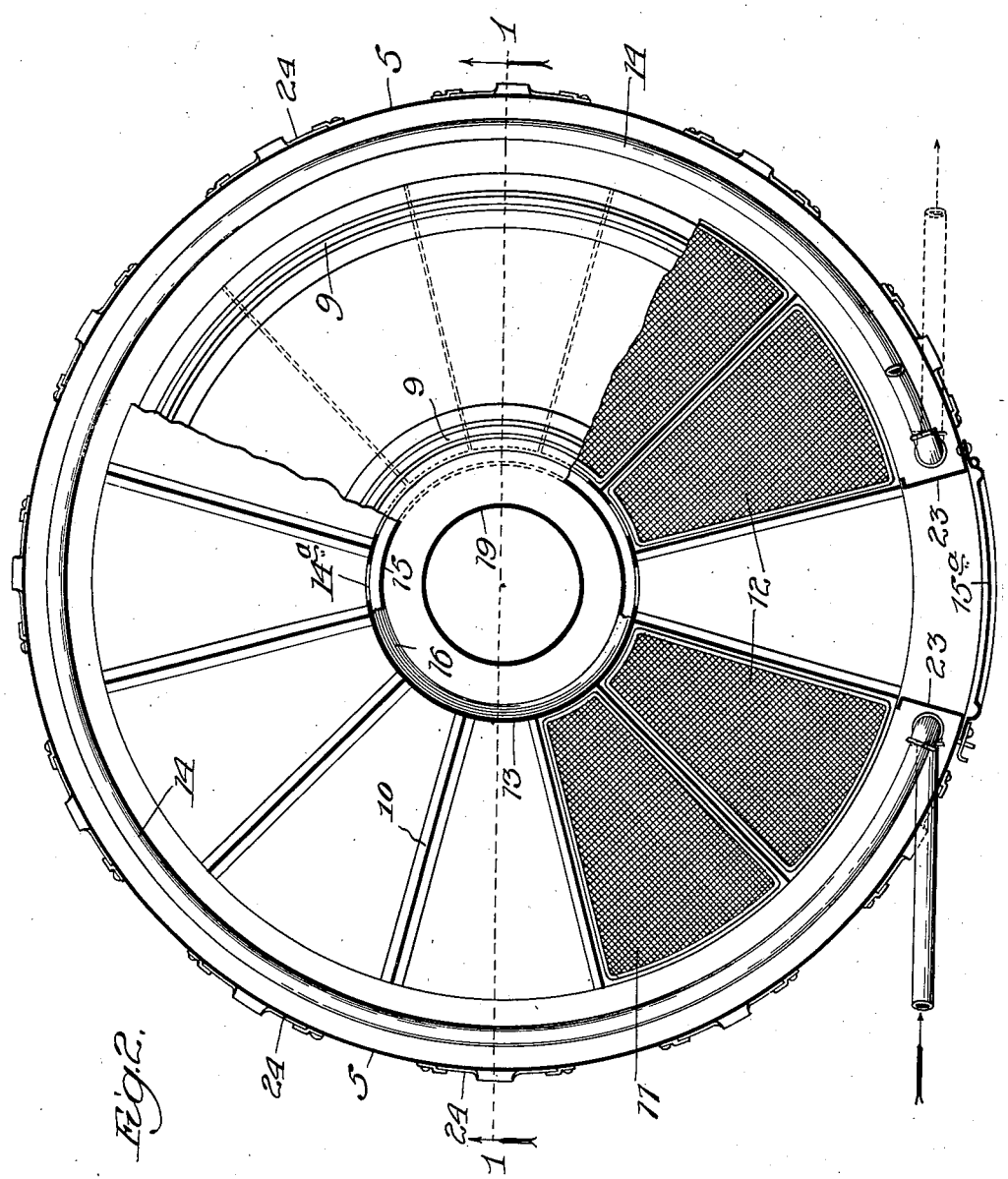

1,442,179

UNITED STATES PATENT OFFICE.

JOSEPH SCHNEIBLE, OF CHICAGO, ILLINOIS.

DRYING OR DESICCATING APPARATUS.

Application filed August 27, 1920. Serial No. 406,278.

*To all whom it may concern:*

Be it known that I, JOSEPH SCHNEIBLE, a citizen of the United States, residing at Chicago, in the county of Cook and State of Illinois, have invented new and useful Improvements in Drying or Desiccating Apparatus, of which the following is a specification.

The present invention relates to improvements in apparatus for desiccating or drying fruits, vegetables, drugs, and other materials, more particularly where careful control of the rate and temperature of drying are of importance. It will be fully understood from the following description of a specific embodiment thereof, illustrated by the accompanying drawings, in which—

Fig. 1 is a view of a device suitable for carrying out the present invention, partly diagrammatic and partly in vertical section, and Fig. 2 is a plan view, partially broken away of the drying device shown in section in Fig. 1.

Referring more particularly to the drawings, the numeral 5 indicates a chamber, preferably of the form of a vertically disposed cylinder, and provided centrally with a frusto-conical depression or sump 6. An annular carrier 7 is rotatably mounted within the chamber 5, for example by means of wheels 8 traveling on circular tracks 9.

The carrier 7 is provided with tiers of trays for the reception of the materials to be desiccated, and may be suitably constructed in the following manner: Upon the base plate of the carrier 7 tray supports 10 extending radially with respect to the carrier are mounted, these supports being preferably arranged in vertical alignment. The supports 10 are preferably formed as angle irons upon which the sector-like trays 11 may be removably positioned, and are secured to uprights 12 on the outer periphery of the carrier 7 and to a vertical cylindrical member 13 which forms the central portion of the carrier. A series of coils 14 for heating fluid surround the carrier 7 except for the space opposite the door 15ª provided in the peripheral wall of the chamber 5, for the insertion and removal of trays.

The central cylindrical member 13 of the carrier 7 is provided with openings 14ª opposite each of the trays carried by it and likewise supports a series of cylindrical shields 15 by means of flanges 16, each of these shields being disposed inside of a horizontally aligned series of openings 14ª. A circular distributing pipe 17, perforated as indicated at 17ª, fed with cooling liquid from pipe 18, is arranged in the chamber 5 near its top, and within the central member 13 of the carrier 7. A central cylinder 19, open at the top and closed at the bottom, projects downwardly from the top of the chamber 5 to approximately the bottom thereof, being positioned within the distributer 17 for cooling liquid. The depression or sump 6 is drained through pipe 20 by means of pump 21, the liquid withdrawn therefrom being forced through the countercurrent cooler 22 back to feed pipe 18 and distributing pipe 17.

A door 15ª is provided in the vertical peripheral wall, and is somewhat wider than the widest part of the sector-like removable trays 12 so that the latter may be readily inserted and removed. Just within the door 15ª and in the space between the peripheral wall of the chamber 5 and the carrier two radial vertical partition members 23, 23 are provided, one on each side of the door opening.

In carrying out the present process in the device illustrated the vertical tiers of tray supports upon the carrier 7 are successively filled with trays containing the material to be dried as the carrier is rotated past the door, the drying action being begun as soon as the first tier has been filled and moved past the door. The heating medium, for example, steam, is introduced into the heating coils 14, being controlled to heat the air in the chamber 5 to the desired temperature, and the cooling medium, for example, water, is sprayed from the distributing pipe 17 into the center of the device, the shields or baffles 15 preventing its passage through the openings 14ª in the central member 13 of the carrier. The cooling liquid, together with the water which may be condensed by it from the atmosphere in the chamber, is withdrawn from the central well 6 by pump 21, passed through cooling device 22 to reduce it to the desired low temperature, and returned to the distributing pipe 17.

The temperature to which the air within the chamber is heated by the coils 14 and the temperature to which it is cooled by the cooling medium may be readily controlled in accordance with the character of the material to be dried and the desired rate of evaporation. As the air supplied to the heating coils is always saturated with moisture at the cooling temperature, by control of the latter the moisture content of the air may be controlled. For example, in the drying of materials capable of withstanding moderately high temperature, the temperature of cooling may be, for example, 50° F. and the air may be heated to, say, 150° F. at the coils, in which case the air passing over the material to be dried is very low in moisture content and the rate of drying is very rapid. In such case the cooling temperature is in general below the saturation temperature or dew-point of the air after its passage over the material to be dried. If slower rates of drying are desired they may be secured by lowering the temperature of the coils, thereby reducing the temperature to which the air is heated, or by raising the temperature of the cooling medium. Thus, if the heated air be at 150° F. and the cooling water at 110°, the air passing over the drying trays will be about one-third saturated with moisture at the beginning of its use and will consequently take up moisture from the material on the trays at a slower rate. Or if the cooling water be maintained at 50° F. and the heating coils be regulated to give the air a temperature of about 82° F. before it passes over the trays, the air will be about one-third saturated with moisture and the rate of drying will be retarded by this fact and by the lower moisture carrying capacity of the air at the temperature used.

The cooling action of the cooling spray of liquid upon the atmosphere within the chamber in proximity to one margin of the confined area in which the material to be dried is exposed to the atmosphere, and the heating action of the heating coil automatically causes a movement of the air over the material in the direction of the cooled area. In the device illustrated a circulation of the air within the chamber is effected by the return movement of the air under the imperforate bottom plate of the carrier 7 back to the heating device.

In order to make use of the drying action of the external air, suitable inlet therefor may be provided, for example, the slides 24 near the base of the outer wall of the chamber. Outlet slots may be provided around the upper part of the central cylinder 19, as at 25, which may be normally closed by the cylindrical slide 26 provided with corresponding openings 27. The slide may suitably rest on annular flange 28 and be rotated by operation of hand wheel 29 mounted on rod 30 secured to spider 31, which is attached to slide 26. A suitable outlet flue 32 leads from the top of cylinder 19 to the inlet of suction fan 33. By opening slide 24 and manipulating hand wheel 29 to rotate slide 26 until openings 25 and 27 are in alignment, atmospheric air may be drawn through the device by the fan 35.

Although the present invention has been described in connection with specific details of the embodiment thereof, it is not intended that these details shall be regarded as limitations upon the scope of the invention, except so far as included in the accompanying claims.

I claim:

1. In a drying device, a closed chamber, means in said chamber for supporting the material to be dried to permit free passage of air thereover, said supporting means being provided with an imperforate base-plate spaced from the bottom of the chamber, air-cooling means in proximity to one side of said supporting means and above said base plate, thereby producing an air current therethrough in the direction of the cooling means, and heating means in proximity to the opposite side of said supporting means and above said base plate, the space below the imperforate base-plate serving as a passageway below the said supporting means for the return of cooled air to the heating means.

2. In a drying device, a chamber, means in said chamber for supporting the material to be dried to permit free passage of air thereover, and means for spraying cooling liquid in proximity to one side of said supporting means, thereby producing an air current through the supporting means in the direction of the said spraying means, means to cool the sprayed liquid, and means to cool and return said liquid to the spraying means.

3. In a drying device, a chamber, means in said chamber for supporting the material to be dried to permit free passage of air thereover, and means for spraying cooling liquid in proximity to one side of said supporting means, thereby producing an air current through the supporting means in the direction of the said spraying means, and shields secured to said support to prevent the spray of cooling liquid from contacting with the material upon the support.

4. In drying apparatus, a cylindrical chamber, an annular carrier rotatably mounted therein, said carrier being provided with means for supporting the material to be dried and permitting free passage of air thereover, and cooling means centrally located in the chamber within the carrier.

5. In drying apparatus, a cylindrical chamber, an annular carrier rotatably mounted therein, said carrier being provided with means for supporting the material to be dried, and permitting free passage of air thereover, means for spraying cold water into the chamber within the carrier and in proximity thereto, and means for withdrawing the sprayed water from the chamber.

6. In drying apparatus, a cylindrical chamber, a central depression in the floor of said chamber, an annular carrier surrounding said depression and rotatably supported in said chamber, said carrier being provided with means for supporting the material to be dried and permitting free passage of air thereover, means for spraying cooling water into the chamber within the carrier, said water collecting in said depression, and means for withdrawing it therefrom.

7. In drying apparatus, a cylindrical chamber, a central depression in the floor of said chamber, an annular carrier surrounding said depression and rotatably supported in said chamber, said carrier being provided with means for supporting the material to be dried and permitting free passage of air thereover, means for spraying cooling water into the chamber within the carrier, means for collecting the liquid, and means for returning it to the spraying means.

8. In drying apparatus, a cylindrical chamber, an annular carrier rotatably mounted therein, said carrier being provided with means for supporting the material to be dried and permitting free passage of air thereover, cooling means centrally located in the chamber within the carrier, and a heating coil substantially surrounding said carrier.

9. A carrier for a drying device comprising an annular base-plate, a central perforated cylinder mounted thereon, horizontal radial tray supports secured to the base-plate and to the said cylinder, and means secured within the cylinder for shielding the perforations thereof.

10. A drying device comprising a closed cylindrical chamber, a carrier rotatably mounted therein, said carrier comprising an annular base-plate, a central perforated cylinder mounted thereon, horizontal radial tray supports secured to the base-plate and to the said cylinder, shields secured within the cylinder and protecting the perforations thereof, means for spraying cooling liquid within the cylinder, and heating means substantially surrounding the carrier.

11. A drying device comprising a cylindrical chamber, a carrier rotatably mounted therein, a central cylinder extending downwardly into the chamber, the chamber being provided with openings in its outer wall and the cylinder being provided with openings, a suction means connected to said cylinder and means for closing said openings.

12. In drying apparatus, a cylindrical chamber, an annular carrier rotatably mounted therein, said carrier having an imperforate base plate and being provided with means for supporting the material to be dried and permitting free passage of air thereover, cooling means centrally located in the chamber within the carrier and heating means within the chamber above the plane of said base plate, the space below the base plate serving as a passageway below the supporting means for the movement of cooled air through the heating means from the cooling means.

JOSEPH SCHNEIBLE.